C. G. ERICSON.
APPARATUS FOR REMOVING EXCESS SPELTER FROM HOT GALVANIZED ARTICLES.
APPLICATION FILED FEB. 7, 1921.
1,390,990.
Patented Sept. 20, 1921.
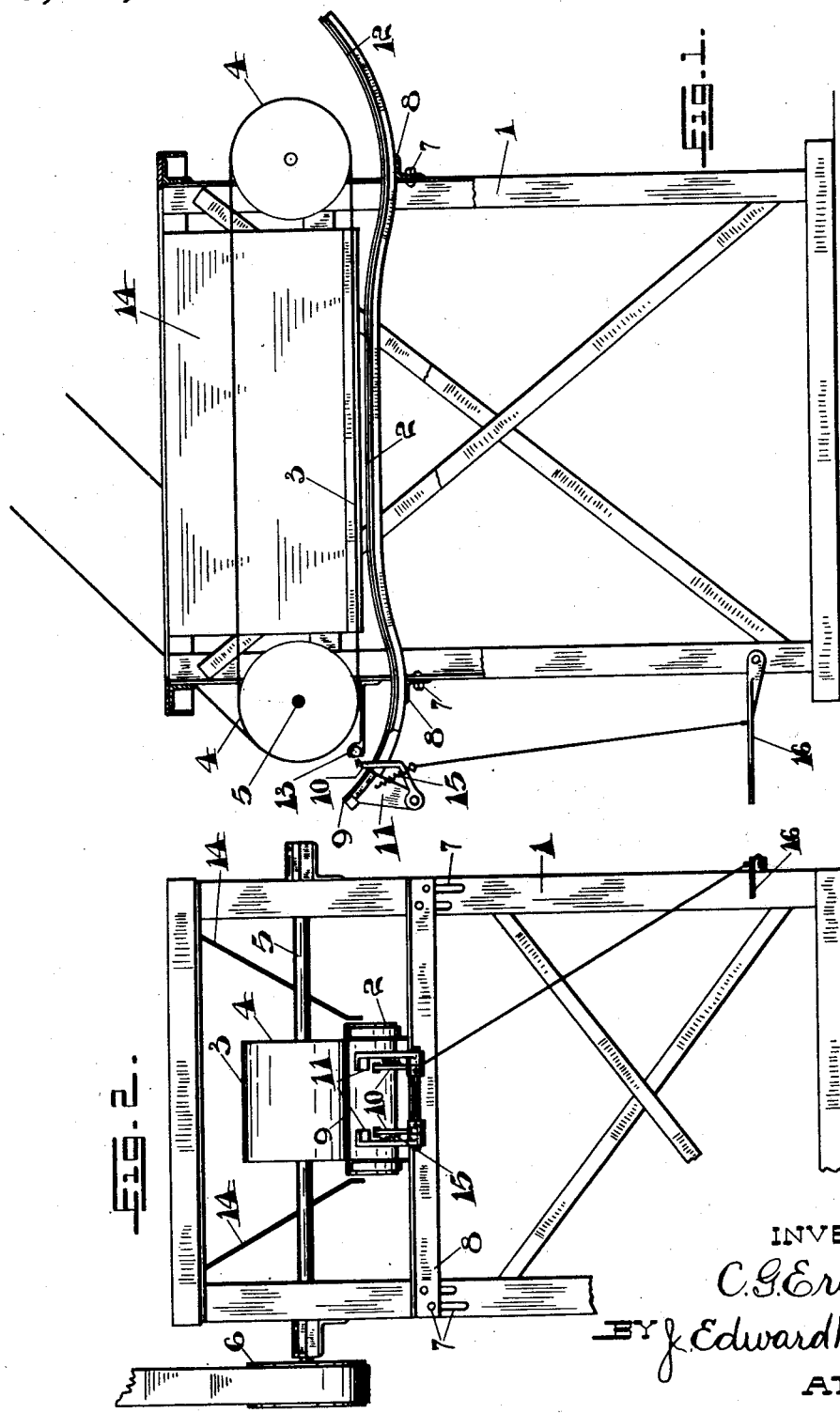
INVENTOR.
C. G. Ericson.
BY J. Edward Maybee.
ATTY.

UNITED STATES PATENT OFFICE.

CHARLES G. ERICSON, OF TORONTO, ONTARIO, CANADA.

APPARATUS FOR REMOVING EXCESS SPELTER FROM HOT GALVANIZED ARTICLES.

1,390,990.        Specification of Letters Patent.     Patented Sept. 20, 1921.

Application filed February 7, 1921. Serial No. 443,271.

*To all whom it may concern:*

Be it known that I, CHARLES G. ERICSON, of the city of Toronto, in the county of York, Province of Ontario, Canada, a subject of the King of Great Britain, have invented certain new and useful Improvements in Apparatus for Removing Excess Spelter from Hot Galvanized Articles, of which the following is a specification.

This invention relates to apparatus for removing excess spelter from hot galvanized articles, and particularly adapted for the treatment of rods or bolts, and my object is to devise a machine for this purpose operating by centrifugal action, which can be quickly installed at small initial cost, and which will not in any way injure or distort the objects treated.

I attain my object by means of the constructions hereinafter described and illustrated in the accompanying drawings in which—

Figure 1 is a side elevation, partly broken away, of apparatus constructed in accordance with my invention; and Fig. 2 an end elevation of the same.

In the drawings like numerals of reference indicate corresponding parts in the different figures.

1 is a frame, preferably formed of structural metal and suitably shaped to support the different parts. This frame is adapted to carry two surfaces, one at least of which is moving, and which are adapted to engage the articles to be treated to impart to them a rapid rotary movement on their own axes, while at the same time they are caused to travel longitudinally of the apparatus for discharge after treatment.

In the preferred form, one of the surfaces is formed as a stationary table 2 supported on the frame as hereinafter described. Above this table is supported the traveling surface, which is preferably formed as an endless belt 3 running on pulleys 4 suitably journaled on the frame 1 at opposite ends of the table.

One of these pulleys is carried by a shaft 5, to which is connected the drive pulley 6 by means of which the belt may be driven at a high rate of speed from any suitable source of power.

As the surfaces between which the articles are rolled require to be spaced to suit the diameters of the articles being rolled, it is necessary to make these surfaces adjustable relative to one another. The simplest method is to make the table 2 vertically adjustable on the frame 1. I therefore provide bolt and slot connections 7 between vertical members of the frame 1 and the cross members 8 supporting the opposite ends of the table.

To facilitate the introduction of the articles to be treated between the surfaces which effect the rolling movement, I upwardly curve the feed end 9 of the table. Any round or approximately round article placed on this inclined feed end will, under the action of gravity, roll down until it reaches a position where it will be engaged by the traveling belt. It is necessary of course, that the articles shall be fed with their axes exactly at right angles to their direction of travel through the apparatus. I therefore provide movable alining stops against which the articles to be treated may be placed. The preferred arrangement is shown in the drawings, the stops comprising a pair of arms 10 rigidly connected to move simultaneously and journaled in brackets 11 secured to the under side of the feed end 9 of the table. Normally the stops are held in their operative position by a coil spring 15 and treadle 16 is provided suitably connected to the stops whereby they may be depressed at will.

As the articles being treated are caused to roll very rapidly by the action of the belt, it is advisable to provide some means for checking their speed before their discharge from the machine so as to avoid damage due to their striking violently on previously treated articles or other parts. I therefore provide the upwardly curved discharge end 12 on the table. As the articles after treatment roll up this discharge end, their rolling and forward movements are gradually checked owing to the influence of gravity and they drop off the end of the discharge portion of the table with their momentum practically destroyed.

As the belt requires to be made of material which would suffer damage from excessive heat, it is necessary to provide means for cooling the portions of the articles to be treated which contact with the belt. I therefore provide adjacent the alining stops 10 cooling means. Preferably the cooling means comprise a pipe 13 through which a cooling fluid such as water or air may be caused to flow and discharged from suitable jets toward the table so as to contact with the articles as they move down the feed end thereof.

It will be understood that the articles operated on will be longer than the width of the table and belt, and will therefore project beyond the sides of the table either at one or both sides. As only the part of the article in contact with the belt is cooled, the end or ends remain in their heated condition with the hot spelter in a liquid condition thereon. The high speed of rotation given to the article causes any excess spelter to be thrown off by centrifugal action, leaving only just sufficient for the proper protection of the iron underneath. As this action produces a spray of small particles of spelter which must not be allowed to contact with the belt, I provide the inclined splash boards 14 which extend laterally and upwardly from positions adjacent the sides of the table in such a manner as to completely protect the belt.

My apparatus presents many advantages over other devices for a similar purpose with which I am acquainted, as any devices for this purpose, other than centrifugal, are either ineffective in throwing off excess spelter or else bruise or distort the articles treated, and while the use of centrifugal action is known, it has only been utilized by apparatus which is complicated and expensive in installation and slow in operation.

My apparatus, on the contrary, is simple and the excess spelter is thrown off in such a manner as to leave a very even and uniform coating. The apparatus is especially useful in treating hot galvanized threaded bolts, as the mode of treatment removes the excess spelter from the threads without causing any injury to the latter. I find that the work is so effectively done that nuts may be applied to the bolts without any necessity for the slow and expensive operation of re-cutting or re-rolling of threads which is now commonly employed. By treating threaded bolts in this manner, a substantial saving in the cost of manufacture is effected, as the bolts are ready for use after leaving the machine and also as the excess spelter is saved and may be returned to the bath.

What I claim as my invention is:—

1. Apparatus for removing excess spelter from galvanized articles comprising a surface over which a portion of an article may be rolled; and a traveling surface coöperating with said first mentioned surface to effect said rolling movement.

2. Apparatus for removing excess spelter from galvanized articles comprising a table over which a portion of an article may be rolled; a traveling surface coöperating with the table to effect said rolling movement; and cooling means located at the feed end of the table adapted to cool the portion of the article contacted by the traveling surface.

3. Apparatus for removing excess spelter from galvanized articles comprising a table over which a portion of an article may be rolled; pulleys journaled adjacent the table ends; and a belt carried on said pulleys coöperating with the table to effect said rolling movement.

4. Apparatus for removing excess spelter from galvanized articles comprising a table over which a portion of an article may be rolled; a traveling surface coöperating with the table to effect said rolling movement; and an inclined feed end for the table down which the articles may roll by gravity to a position for engagement between the table and traveling surface.

5. Apparatus for removing excess spelter from galvanized articles comprising a table over which a portion of an article may be rolled; a traveling surface coöperating with the table to effect said rolling movement; an inclined feed end for the table down which the articles may roll by gravity to a position for engagement between the table and traveling surface; and movable alining stops for the articles toward the upper end of said feed end.

6. Apparatus for removing excess spelter from galvanized articles comprising a table over which a portion of an article may be rolled; and an upwardly inclined discharge end for the table extending beyond the portion of the table coöperating with the traveling surface.

7. Apparatus for removing excess spelter from galvanized articles comprising a table over which a portion of an article may be rolled; a traveling surface coöperating with the table to effect said rolling movement; an inclined feed end for the table down which the articles may roll by gravity to a position for engagement between the table and traveling surface; and an upwardly inclined discharge end for the table extending beyond the portion of the table coöperating with the traveling surface.

8. Apparatus for removing excess spelter from galvanized articles comprising a table over which a portion of an article may be rolled; a traveling surface coöperating with the table to effect said rolling movement; an inclined feed end for the table down which the articles may roll by gravity to a position for engagement between the table and traveling surface; movable alining stops for the articles toward the upper end of said feed end; and cooling means adjacent the stops adapted to cool the portion of the article subsequently contacted by the traveling surface.

9. Apparatus for removing excess spelter from galvanized articles comprising a table over which a portion of an article may be rolled; pulleys journaled adjacent the table ends; a belt carried on said pulleys coöperating with the table to effect said rolling movement; and means for adjusting the relative position of the table and belt.

10. Apparatus for removing excess spelter from galvanized articles comprising a table over which a portion of an article may be rolled; a traveling surface coöperating with the table to effect said rolling movement; and cooling means located at the feed end of the table adapted to cool the portion of the article contacted by the traveling surface; and a laterally and upwardly inclined splash board supported adjacent the side of the table and extending longitudinally thereof to deflect splashes of spelter thrown off from the rotating article.

Signed at Toronto, Ontario, this 26th day of January, 1921.

CHARLES G. ERICSON.